Oct. 13, 1959
E. W. BOLLMEIER
2,908,744
CABLE SPLICE COVER
Filed May 28, 1956
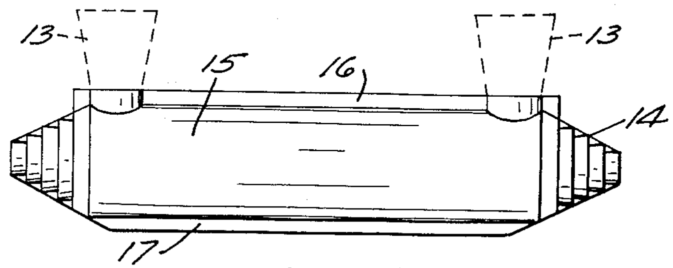
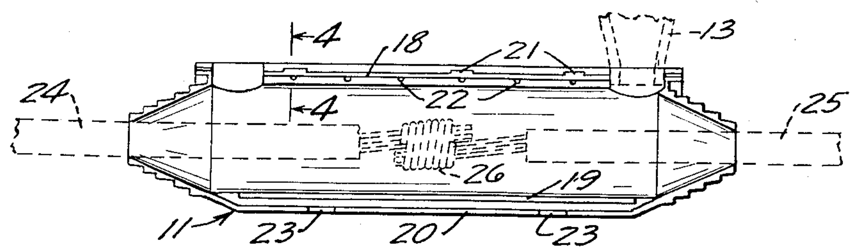
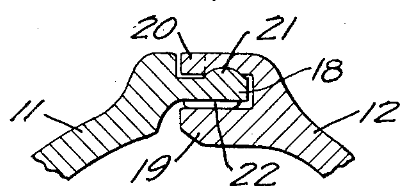
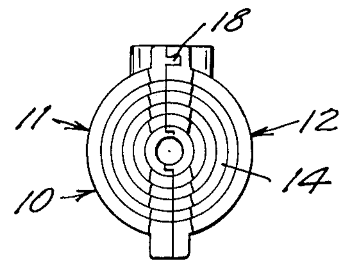
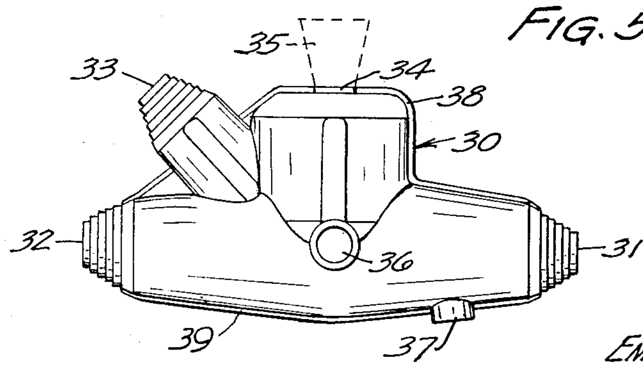
INVENTOR
EMIL WAYNE BOLLMEIER
BY
Carpenter, Abbott, Coulter & Kinney
ATTORNEYS United States Patent Office 2,908,744

Patented Oct. 13, 1959

2,908,744

CABLE SPLICE COVER

Emil Wayne Bollmeier, Mendota Township, Dakota County, Minn., assignor to Minnesota Mining and Manufacturing Company, St. Paul, Minn., a corporation of Delaware Application May 28, 1956, Serial No. 587,529

2 Claims. (Cl. 174—76)

This invention relates to the protection of splices and connections in insulated electrical cables, and is particularly concerned with protective covers for splices which are to be further encapsulated and protected with self-hardening liquid resins.

Insulating compositions which are to be applied to wire-splices must be sufficiently fluid to penetrate readily into the interstices between conductors or between clamps and conductors in order to fill all such spaces and provide for adequate protection and insulation. The composition may be applied in molten condition and allowed to harden by cooling. Preferably, a self-reactive liquid resinous composition is provided which more or less rapidly hardens by chemical reaction to a solid state in which it is no longer liquefiable on heating. Splices and junctions filled and surrounded with such compositions are effectively protected from the corrosive effects of moisture and atmosphere, and are electrically and mechanically superior to less effectively protected connections.

During the application of the liquid resin to the splice, it is necessary to maintain the liquid in position and condition for penetrating the interstices until complete impregnation is achieved. It is also necessary to permit the escape of the air or other gases normally present in the interstices. The present invention provides means for accomplishing these results, by supplying a multi-part cover member which when assembled over the splice area serves as a liquid-tight container from which the displaced air is automatically vented. The cover is light in weight, easily and quickly assembled, electrically insulative, and neat in appearance. It remains in place over the resin-impregnated splice area as a permanent protective cover, and assists in maintaining in trouble-free condition the power or communications circuits on which it is used.

Specific illustrative but non-limitative examples of novel splice-cover assemblies made in accordance with the principles of this invention are shown in the accompanying drawing, in which Figure 1 is an outer side elevation and Figure 3 an end elevation of one form of cover-member, and Figure 2 is an internal side elevation of one segment of said cover-member;

Figure 4 is a detail showing the liquid-tight but air-venting edge seal between segments of the cover-member, and Figure 5 is a side elevation of an alternative form of cover-member designed for Y-splices.

The cover member illustrated in Figures 1–3 is designed for the protection of a line splice, as indicated by dotted lines in connection with Figure 2. The multi-strand conductors of insulated cables 24 and 25 are joined together with a connector element 26, here illustrated as a spiral wrapping of spring-wire. The splice area is enclosed within the two halves 11 and 12 of the cover member 10. The circularly serrated conical end portions 14 are designed to provide a close-fitting junction with the insulated cable, appropriate segments being removed from the original cone to provide the desired fit. With the two halves snapped into place and with the end sections in close contact with the cables, and with the detachable pouring spouts or funnels 13 in position, the cover is supported with the pouring spouts at the top, and the desired temporarily liquid impregnating and insulating composition is poured into the cover and around the splice area, partially filling both spouts. Much of the air displaced by the liquid resin as it enters through one of the funnels is forced out through the opposite funnel. Any remaining quantity of air which accumulates along the upper seam 16 of the cover assembly is vented through the seam, which however effectively prevents the escape of any of the liquid composition. The interior of the cover member is thus completely filled, and the splice area completely impregnated, with the liquid composition.

The two segments 11 and 12 of the cover member 10 are joined together along upper and lower snap seal portions 16 and 17 indicated in Figure 1 and more specifically illustrated in Figure 2. The joints along the sides of the two halves of each conical end piece are simple overlapping or shiplap joints, since air does not accumulate along these surfaces and no venting is required. On the contrary, joints 16 and 17 are modified tongue-and-groove joints, a tongue portion being illustrated at the top and a groove portion at the bottom of the segment 11 of Figure 2. It will be apparent that the opposing segment 12 will have the same grooves in the reverse position.

The upper edge area of Figure 2 is provided with a continuous longitudinal tongue member 18 having along its upper edge a series of longitudinal ridges 21 and along its lower edge a series of narrow transverse fins 22. The lower edge area of Figure 2 has a pair of longitudinal lips 19 and 20 forming a narrow channel therebetween. The lip 20 is discontinuous, the discontinuities being indicated at 23. The dimensions of the tongue and groove are such that the tongue, in the absence of ridges 21 and fins 22, would fit loosely within the groove formed by the lips 19 and 20 of the opposing segment.

A cross-section of a completed joint is shown in Figure 4, the section being taken at the location indicated in Figure 2 but including portions of both the segments 11 and 12. As shown in Figure 4, the lip member 20 is provided with a longitudinal groove along the inner face, the groove being designed to fit the ridge segments 21 of the tongue 18. The fin 22 at the bottom of the tongue 18 presses against the inner surface of the lower lip 19 and forces the ridge 21 into tight contact with the interior of the groove in the upper lip 20. A rigid connection or joint is thus formed, which however still provides narrow air passages leading from within the cover formed by the segments 11 and 12 around and along the tongue member 18 and to the outside between the tongue and outer lip 20 at areas between the ridge segments and through the openings 23. These tortuous passages within the joint are of substantially capillary dimensions, and effectively prevent loss of the viscous resinous liquid components, while still permitting the venting of air or other gases. In a typical example, the open passages are of the order of 5 mils (0.005 inch) in thickness.

The material of which the cover member is constructed is necessarily somewhat elastic so that the two edges may be snapped together to form the desired seal. Various organic plastics are suitable. Nylon (polyamide), cellulose acetate butyrate, and unplasticized vinyl chloride-acetate plastics are illustrative. Cover members made of these materials are easily produced to exact tolerances by commercial molding techniques, are light in weight, mechanically tough and strong, and provide effective electrical insulation.

Figure 5 illustrates another example of a cover unit made in accordance with the invention but designed to accommodate a Y splice rather than a straight splice, and accordingly having three outlet openings 31, 32 and 33 rather than the two openings shown in Figure 1. The unit has the same type of tongue-and-groove edge connections, e.g. as indicated at edges 38 and 39 in the drawing, as were illustrated and described in connection with the previous drawings. Since only a single pouring spout 35 is provided, it is relatively difficult to remove all of the air displaced from within the cover through the spout, and hence the necessity for an air-venting type of joint is still greater in the construction of Figure 5 than in that of Figure 1. The construction of the joint employed is fully effective in providing the required release of air.

The cover 30 of Figure 5 is shown in the normal vertical position, with the position of the funnel 35 indicated at the topmost location. In some instances, as in covering splices which are relatively immovable and are otherwise oriented, the cover may be filled by sealing the opening 34, removing the cover 36 or 37, depending on the orientation of the assembly, and then placing the funnel 35 in such appropriate opening for vertical pouring.

Thermoplastic compositions such as asphalts, pitch, waxes or similar materials are useful under some conditions for filling the splice cover and for insulating and protecting the splice area. Since these materials remain liquefiable upon heating it is preferred to employ self-hardening liquid resinous compositions.

One such liquid self-hardening compound which has given particularly desirable results in terms of high initial fluidity, rapid cure, firm adherent bond to all contacted surfaces, high mechanical and electrical strength, and superior resistance to penetration by water or water vapor, consists of a mixture of liquid epoxy resin with a minor proportion of a liquid mixture of reagents reactive therewith and comprising liquid polythiopolymercaptan polymer and liquid polyamine. The epoxy resin is a reaction product of a bisphenol and epichlorohydrin, having free epoxy groups in the molecule. "Epon" resin No. 562 is a typical commercial example; and "Thiokol" polymer LP-2 is a commercial example of a suitable liquid polythiopolymercaptan polymer. Polyamines such as 2,4,6-tri(dimethylaminomethyl) phenol are effective activators for these compositions. The several components may be separately measured and all combined at the same time. More desirably, the amine and the polysulfide polymer are separately mixed together, and this mixture is combined with the epoxy resin just prior to pouring the composite around the splice. Mixing is conveniently accomplished in a flexible plastic bag, from which the mixture is poured directly into one of the open spouts of the splice-protector.

After the resin has hardened, the funnel member or members, together with any hardened resin contained therein, may be cut or otherwise removed from the assembly if desired for improved appearance or to conserve space.

I claim:

1. A multi-part cover member suitable for assembling around a splice area of an insulated electric cable in providing a liquid-tight air-venting receptacle for temporarily liquid impregnating and encapsulating compositions, each part of said multi-part cover member having edge areas coacting with opposing edge areas of other said parts to provide a mechanically strong interlocking joint capable of venting air while retaining said liquid composition, one such edge area having a continuous open channel between opposing parallel elastic lip members of which the outer lip member is discontinuous and internally longitudinally grooved, the corresponding opposing edge area having a longitudinal tongue member fitting within said channel, said tongue being provided on its inner surface with a series of spaced-apart narrow lateral projecting fins and on its outer surface with a series of spaced-apart longitudinal ridges, said ridges fitting within the groove of said outer lip member and said fins bearing against the other of said lip members to provide a mechanically rigid joint.

2. A snap joint assembly capable of providing an air-venting, liquid-tight, and mechanically rigid seal between articles to be joined, and comprising on said articles a pair of coacting edges, one of said edges having a continuous open channel between parallel inner and outer elastic lip members, said outer lip member being discontinuous and being grooved longitudinally facing the inner lip member; the other of said edges having a continuous tongue member fitting within said channel, provided on one face with a series of longitudinally separated ridges shaped and positioned to co-act with the groove of said outer lip member, and provided on the opposite face with a series of narrow fins laterally of said tongue; said fins bearing against the face of said inner lip member and forcing said ridges into tight contact with the interior of said groove when said tongue is forced into said channel in assembling the snap joint.

References Cited in the file of this patent

UNITED STATES PATENTS

| | | |
|---|---|---|
| 420,171 | Seely | Jan. 28, 1890 |
| 1,027,929 | Stryker | May 29, 1912 |